United States Patent [19]

Schmidts et al.

[11] Patent Number: 4,527,690
[45] Date of Patent: Jul. 9, 1985

[54] TAPE CASSETTE CONTAINER

[75] Inventors: Kurt Schmidts; Walter Schuett, both of Kehl, Fed. Rep. of Germany

[73] Assignee: BASF Aktiengesellschaft, Ludwigshafen, Fed. Rep. of Germany

[21] Appl. No.: 444,961

[22] Filed: Nov. 29, 1982

[30] Foreign Application Priority Data

Nov. 28, 1981 [DE] Fed. Rep. of Germany ... 8134835[U]

[51] Int. Cl.³ ............................................. B65D 85/672
[52] U.S. Cl. ..................................... 206/387; 206/477; 206/45.15; 220/331; 220/334
[58] Field of Search ............... 206/45.13, 45.14, 45.15, 206/45.18, 45.19, 45.23, 387, 477; 220/336, 23.4, , 234, 235, 331, 338; 229/43, 44 M; 312/8, 13, 14, 313, 314

[56] References Cited

U.S. PATENT DOCUMENTS

| 3,166,080 | 1/1965 | Neale | 220/335 |
| 3,532,211 | 10/1970 | Gellert | 220/331 |
| 3,754,639 | 8/1973 | Gellert | 220/331 |
| 3,837,653 | 9/1974 | Fox et al. | 206/45.15 |
| 3,978,985 | 9/1976 | Zinnbauer | 206/387 |
| 4,282,983 | 8/1981 | Swartzbaugh | 220/335 |
| 4,291,801 | 9/1981 | Basili et al. | 206/387 |
| 4,325,595 | 4/1982 | Solomon | 206/45.13 |
| 4,362,118 | 12/1982 | Koch, Jr. et al. | 220/335 |
| 4,378,066 | 3/9183 | Sato et al. | 220/336 |
| 4,397,389 | 8/1983 | Findeisen | 206/387 |
| 4,399,928 | 8/1983 | Klingler | 220/335 |

FOREIGN PATENT DOCUMENTS 1300864 7/1969 Fed. Rep. of Germany .
2366195 7/1973 Fed. Rep. of Germany .

Primary Examiner—Joseph Man-Fu Moy
Assistant Examiner—David Fidei
Attorney, Agent, or Firm—Keil & Weinkauf

[57] ABSTRACT

A protective container for tape cassettes (K) consists of a bottom part (I) and lid part (II), which are pivotable relative to one another, so as to effect closing and opening of the container. Means (3, 17) restrict the opening of the parts to an angle of less than 180°, in particular to angles of 90°–140° or 120°–130°. A specific force is required to open the container, thereby additionally ensuring that the container is not opened unintentionally and the tape cassette does not drop out. The container is useful for storing tape cassettes, film cassettes, magnetic tape cassettes, etc.

11 Claims, 6 Drawing Figures

TAPE CASSETTE CONTAINER

BACKGROUND OF THE INVENTION, INCLUDING DESCRIPTION OF THE PRIOR ART

The present invention relates to a protective tape cassette container of rectangular parallelepipedal shape, comprising an open bottom part with lateral hinge pins and a lid part possessing a pouch for the cassette, the side walls of the pouch having groove-shaped recesses for the hinge pins to form two pivot joints for enabling the lid part to be pivoted relative to the bottom part for opening and closing the container, and means for resisting the opening movement of the lid part, carrying the tape cassette, relative to the bottom part beyond a desired position being provided in the vicinity of the pivot joints, between the bottom part and lid part.

The construction of such a container is disclosed in German Published Application DAS No. 1,300,864. There, the pivoting of the lid is not restricted, as a result of which the lid can drop down and allow the cassette contained therein to fall out. German Published Application DAS No. 2,366,195 discloses a rib-and-slot arrangement for the same container, which restricts the opening angle to 180° C. However, this rib-and-slot arrangement is not effective if the container is opened sharply, so that the lid drops down allowing the cassette to fall to the floor, possibly damaging the cassette.

OBJECT AND SUMMARY OF THE INVENTION

It is an object of the present invention to provide a container with means for limiting the opening angle of the lid part, so that even relatively heavy tape cassettes are prevented from dropping out.

We have found that this object is achieved by providing a protective container for a tape cassette, comprising a bottom part having spaced apart axially aligned hinge pins, a lid part having a pouch, the walls of the pouch having groove-shaped recesses formed therein in which said hinge pins are received to form two pivot joints for enabling the lid part to be pivoted relative to the bottom part from a closed position in which the said parts have substantially the shape of a flat, rectangular parallelepiped, and means in the vicinity of the pivot joints for resisting the opening movement of the lid part relative to the bottom part beyond a desired position, wherein, when the lid is in the closed position and the container is lying flat and horizontally, the said groove-shaped recesses extend substantially vertically, and the said means are located substantially vertically above or below the hinge pins, and limit the angle to which the lid part can be opened to less than 180° from the closed position.

In a further embodiment, the resistance offered by the stop means can be overcome only by exerting a minimum force of not less than 0.5 N and up to about 0.8 N. It is thus possible to match this resistance to the weight of the tape cassette to be protected, which simplifies the production of the container, since only one part of the container needs to be modified.

In advantages embodiments, the resistance offered by the stop means comes into effect either at approximately 140° or at approximately 90° from the closed position or at an angle therebetween. In a particularly advantageous embodiment, it comes into effect at from 120° to 130° from the closed position. This facilitates the automatic filling of conventional compact cassettes into the containers.

In a practical embodiment, a projection can be arranged on each of the short side walls of the lid, parallel to the groove-shaped recess, which projections cooperate with the upper edges of the side walls of the bottom part, thus restricting the opening angle to approximately 90°.

A container construction is thus obtained in which it is basically impossible for the cassette to drop out. Such a container is, for example, very advantageous for video cassettes, which are relatively heavy, or for relatively large audio cassettes, for example the "Unisette" (a Registered Trade Mark of BASF Aktiengesellschaft, Ludwigshafen).

Additional means may be provided to prevent unintentional opening of the novel container, said means consisting of at least one member which may be located on the front edge of the lid part, and engages the long wall of the bottom part when the container is closed.

To improve this engagement, a corresponding recess may be provided on the inner face of the long wall.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
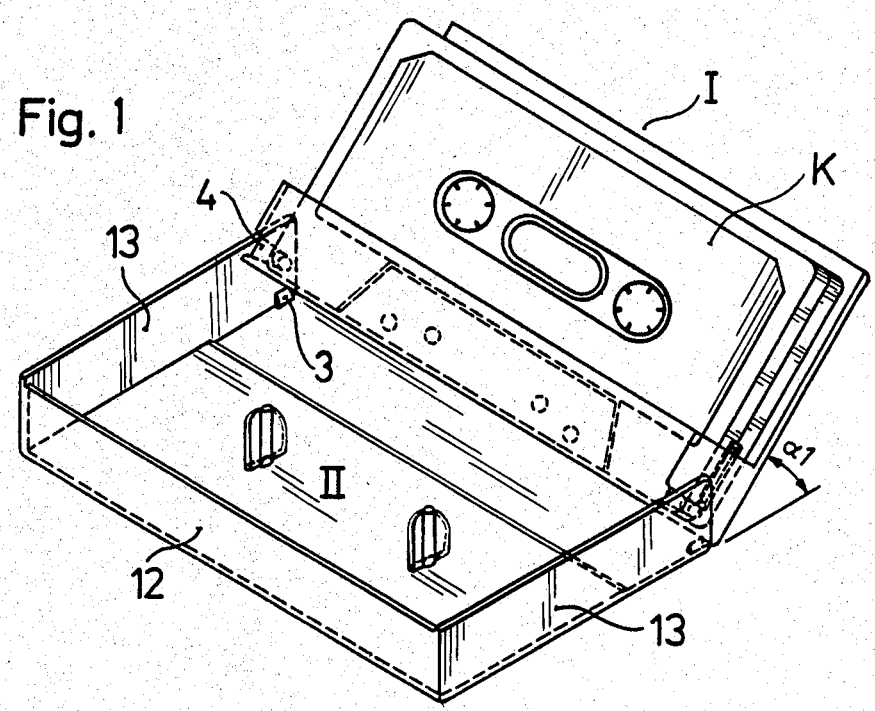
FIG. 1 shows one embodiment of a protective tape cassette container according to the invention with studs on the bottom part, which limit the opening angle of the lid to 140°.

Each of the embodiments of protective container shown in FIG. 1, FIG. 2 and FIGS. 3, 3A, 4 and 4A, have many features in common. In particular, each container is typically molded from a thermoplastics material and is advantageously so constructed that a lid part I is connected to a bottom part II by means of hinge pins 1 and hinge holes 2. For storage, a compact cassette K (see FIG. 1) is placed with its front wall, i.e. the apertured wall, pointing downward, in the pouch of the lid I, and when the latter has been closed onto the bottom II so that the container has the shape of a flat, rectangular parallelepiped, the cassette can be kept in a dustproof manner for ready reference.

When the container is closed, the bottom II must make a positive connection with the lid I, so that when the container is handled it cannot be opened unintentionally and allow the cassette K to drop out. To achieve this positive connection, studs 3 are molded onto the extending portions of the two side walls 13 of the bottom II. The lid I is provided with groove-shaped recesses 4 which, when the lid I is in the closed position and the container is in a flat, horizontal position, are disposed substantially vertically on the short side walls 14 of the lid. The groove-shaped recesses 4 each consist of a channel-like groove formed in a respective wall 14, and a respective hinge hole 2, each groove leading to its respective hinge hole 2 and extending vertically below or above the hole 2.

The studs 3 are so positioned and shaped that when the container is closed they engage with the grooves of the recesses 4 of the lid I. The height of the studs 3 and the depth of the grooves of the recesses 4 are so chosen that a locking force of about 100 pond is generated. The magnitude of the locking force must be selected in accordance with each material used, for example crystal polystyrene, and is usually sufficient to reliably prevent the container from being opened unintentionally.

Figure 2:
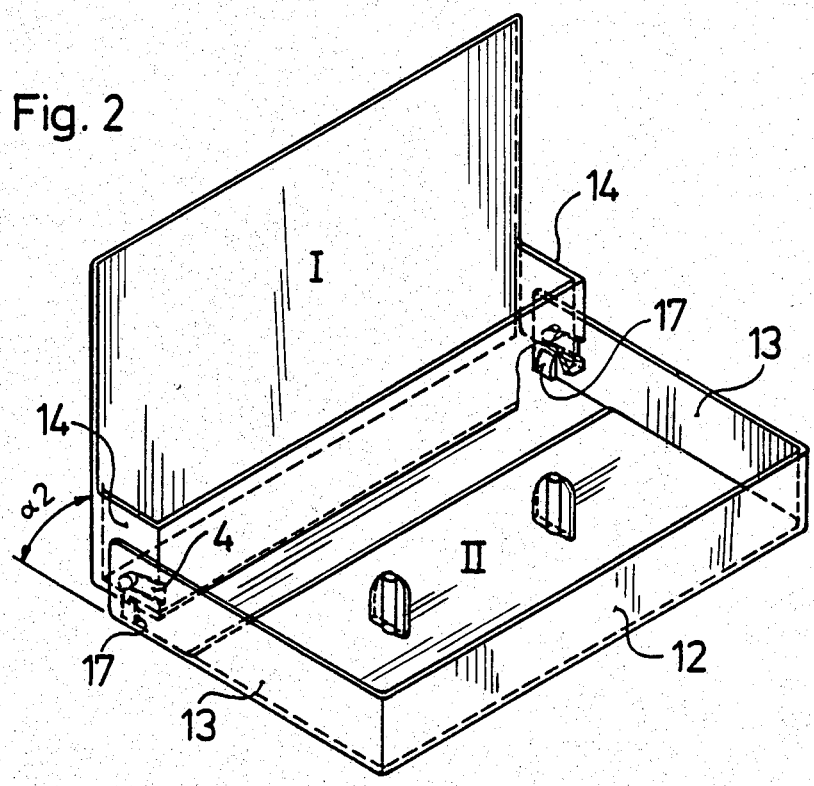
FIG. 2 shows a further embodiment of a protective tape cassette container according to the invention with studs limiting the opening angle to 90°.

On opening the container it is desirable that the lid I should swing back no further than is necessary to take out the cassette K. Moreover, it is desirable that, for ready reference, it should be possible to stand the container so that the cassette K, inserted in the pouch of the lid I, is visible and its title label is thus easily readable. An opening angle of from about 90° to about 140° or preferably from about 120° to 130°, for example about 125°, is advantageous. Restriction of the opening angle is achieved due to the fact that, on opening the container and swinging open the lid I, the studs 3 abut against the outer edges 5 of the bottom 16 of the pouch, and thus resist further opening of the lid. The length (H) of the studs 3 can be varied according to the desired opening angle, ie. the greater the longitudinal extent of the studs (3, 17), the smaller the opening angle $(180° - \alpha)$ becomes. In FIG. 1, the maximum opening angle is about 140° ($\alpha_1 = 40°$). FIG. 2 shows an embodiment with larger studs 17 and a maximum opening angle of 90° ($\alpha_2 = 90°$).

It is a further aim of the novel container design to reliably prevent unintentional pivoting of the lid I beyond the chosen opening angle, so that the cassette K can under no circumstances drop out.

The minimum force which is necessary to prevent such unintentional pivoting of the lid I when the container is opened normally was determined experimentally. This force is not less than 0.5N and preferably from 0.6–0.8N, and provides a sufficiently large safety margin when the container is handled normally. Only when this minimum force is exceeded, which can only be brought about by the exertion of undue force by the person opening the container, does the lid swing right over and the cassette K drop out. In the experiment conventional test apparatus in which an adjustable force could be exerted on the movable parts of the container were employed.

Figure 3:
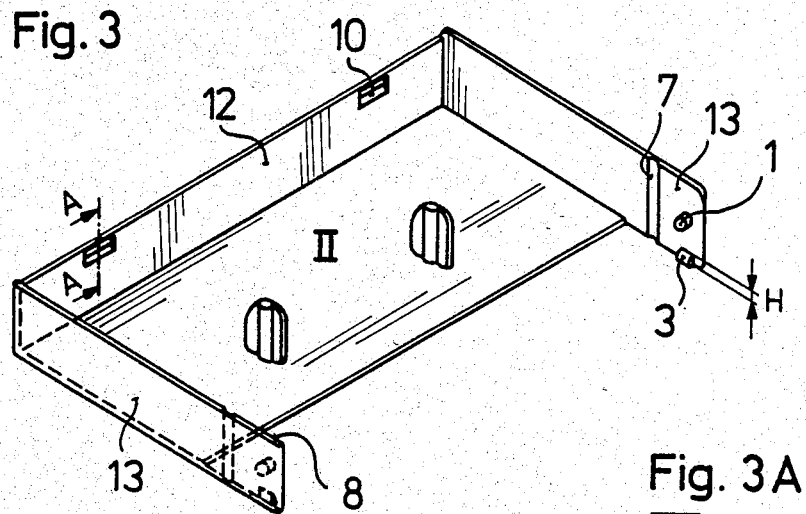
FIG. 3 shows a bottom part or yet another embodiment of a protective tape cassette container according to the invention.
Figure 4:
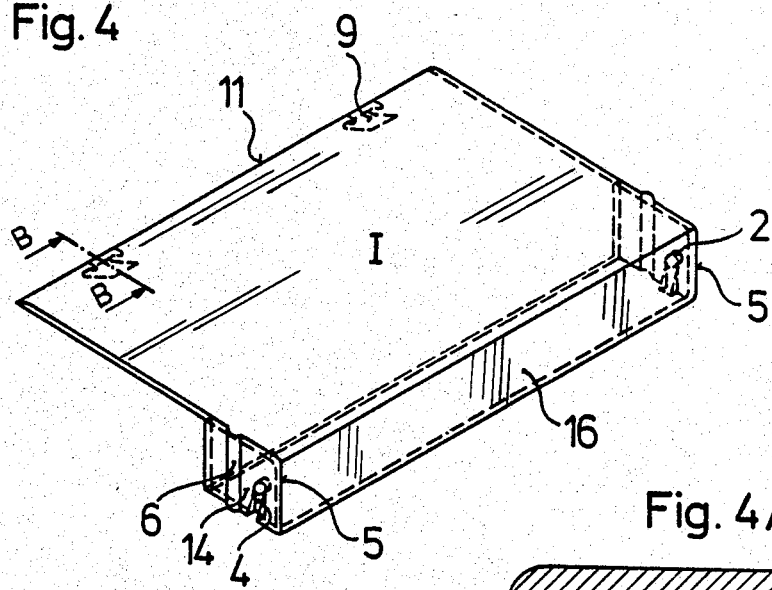
FIG. 4 shows a lid part for the bottom part of the container shown in FIG. 3.

FIGS. 3 and 4 show another embodiment of a container according to the invention. In this container greater forces for retaining the lid in the closed position are provided, so that unintentional opening of the container, after a cassette K has been introduced, can be even more reliably prevented during packaging or during handling. The lid I additionally has, on each side wall 14, a projection 6 which extends over the height of the wall and which, for greater ease of manufacture, is of semi-circular cross-section. The projection 6 runs substantially parallel to the recess 4. To increase these retaining forces, a corresponding recess 7 can be provided on each of the inner faces of the side walls 13 of the bottom II. The position of the projection 6 can be so chosen that, at an opening angle of 90° (as in FIG. 2), the projections 6 abut against the upper edges 8 of the extending portions of side walls 13 of the bottom II, a first stop position thus being obtained. The final stop position, which serves as a safety position in this embodiment, can be provided by the studs 3. The minimum force, which is determined by the projections 6 and the extending portions of side walls 13, can, if the studs 5 are not used, be chosen as described above in connection with the container of FIG. 1. If the studs 3 are present, the minimum force must be about 0.5–0.8N.

The force required to hold the bottom part II and lid part I together in the closed position can be adjusted by varying the shape and dimensions of the projections 6 and/or the depth of the recesses 7.

The springiness, specific to the material used, of the extending portions of the side walls 13 of the bottom II of course determines the retaining force and enables the studs 3 and 17 and the groove-shaped recesses 4 as well as the projections 6 and the recesses 7 to engage and disengage.

Figure 3A:
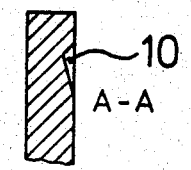
FIG. 3A shows, in section, a detail of FIG. 3.
Figure 4A:
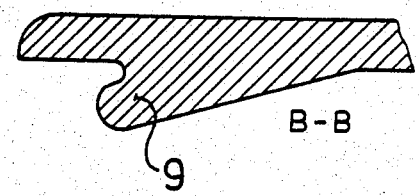
FIG. 4A shows, in section, a detail of FIG. 4.

Even greater retaining forces can be generated if one or more members are provided on the front edge 11 of the lid I, these members engaging the long side wall 12 of the bottom part II. Claws 9 arranged at a distance from the front edge 11 are used for this purpose. To obtain a snap closure, corresponding recesses 10 can be provided on the inner face of the long side wall of the bottom part II. In the closed position of the container, the claws 9 and recesses 10 engage one another. FIGS. 3A and 4A show, in cross-section, examples from amongst a large number of possible forms of retaining means. The depth of penetration of the claws 9 and the depth of the recesses 10, where such recesses are present, can be chosen to give the desired retaining force. As in all other examples of how to adjust the retaining force, the springiness and surface structure of the contacting members of the container, in particular the long side wall 12 and the claws 9, determine the dimensions of the latter.

The containers according to the invention can be produced from any plastic which is normally injection-moldable, for example polystyrene, polyethylene, polypropylene, ABS, polyoxymethylene and the like.

The container embodiments described above meet all the demands to be made on such containers in respect of ease of manufacture, convenient insertion of cassettes (ie. packaging) and easy and reliable handling, and have performed excellently in field tests.

We claim:

1. A protective container for a tape cassette comprising a bottom part having spaced apart axially aligned hinge pins, a lid part having a pouch, the walls of the pouch, which have outside portions, having groove-shaped recesses formed therein in which said hinge pins are received to form two pivot joints for enabling the lid part to be pivoted relative to the bottom part from a closed position in which said parts have substantially the shape of a flat, rectangular parallelepiped, and a pair of studs in the vicinity of the pivot joints, said groove-shaped recesses extending substantially vertically, and said studs being located substantially vertically above or below the hinge pins, when the lid part is in the closed position and the container is lying flat and horizontally, so that the engagement of said studs by the walls of said recesses tends to hold the lid part in said closed position, and, after said lid part has been manually moved out of said closed position, engagement of said studs by said outside portions of the walls of said pouch limits the angle to which the lid part can be opened to an angle of substantially less than 180° from the closed position.

2. A container according to claim 1, wherein the resistance to pivoting of the lid part past said resisting position can be overcome by applying a minimum force of at least 0.5N to the lid part.

3. A container according to claim 1, in which the said minimum force is up to about 0.8N.

4. A container according to claim 1, wherein the said means are positioned so that the resistance to pivoting of the lid part comes into effect at from 90° to 140° from the closed position.

5. A container according to claim 1, wherein the said means are positioned so that resistance to pivoting of the lid part comes into effect at from 120° to 130° from the closed position.

6. A container according to claim 1, wherein the said means are positioned so that resistance to pivoting of the lid part comes into effect at approximately 90° from the closed position.

7. A container according to claim 1, wherein the said means are positioned so that resistance to pivoting of the lid part comes into effect at approximately 140° from the closed position.

8. A container according to claim 1, wherein projections are provided on the said pouch walls parallel to the groove-shaped recesses, the projections cooperating with the bottom part during opening of the lid part to provide an initial resistance to pivoting at approximately 90° from the closed position.

9. A container according to claim 1, wherein at least one member is provided adjacent an edge of the lid part for engagement with a cooperating wall of the bottom part when the container is closed.

10. A container according to claim 1, wherein at least one engagement recess is provided on the inner face of the said cooperating wall of the bottom part.

11. A container according to claim 1, wherein each groove-shaped recess comprises a groove in a respective one of the pocket walls and a hinge pin receiving hole, the said groove leading to said hinge pin receiving hole.

* * * * *